US010267950B2

(12) United States Patent
Cavalcante et al.

(10) Patent No.: US 10,267,950 B2
(45) Date of Patent: Apr. 23, 2019

(54) SYSTEM, METHOD AND PROGRAM PRODUCT FOR PROVIDING POPULACE CENTRIC WEATHER FORECASTS

(75) Inventors: Victor Fernandes Cavalcante, Campinas (BR); Ricardo Guimaraes Herrmann, Sao Paulo (BR); Kiran Mantripragada, Santo Andre (BR); Marco Aurelio Stelmar Netto, Sao Paulo (BR); Lucas Correia Villa Real, Sao Paulo (BR); Cleidson Ronald Botelho De Souza, Sao Paulo (BR)

(73) Assignee: International Business Machines Corporation, Armonk, NY (US)

( * ) Notice: Subject to any disclaimer, the term of this patent is extended or adjusted under 35 U.S.C. 154(b) by 1057 days.

(21) Appl. No.: 13/251,889

(22) Filed: Oct. 3, 2011

(65) Prior Publication Data
US 2013/0085673 A1 Apr. 4, 2013

(51) Int. Cl.
*G01W 1/10* (2006.01)
(52) U.S. Cl.
CPC .................................... *G01W 1/10* (2013.01)
(58) Field of Classification Search
CPC ....................................................... G01W 1/10
USPC ............................................................ 702/3
See application file for complete search history.

(56) References Cited

U.S. PATENT DOCUMENTS

| 7,043,368 | B1 * | 5/2006 | Cote et al. | 702/3 |
| 7,181,346 | B1 * | 2/2007 | Kleist et al. | 702/3 |
| 7,191,064 | B1 * | 3/2007 | Myers et al. | 702/3 |
| 8,386,211 | B2 * | 2/2013 | Nakamura et al. | 702/179 |
| 2004/0215394 | A1 * | 10/2004 | Carpenter et al. | 702/3 |
| 2007/0159355 | A1 * | 7/2007 | Kelly et al. | 340/905 |
| 2009/0312943 | A1 * | 12/2009 | Kelly et al. | 701/204 |
| 2013/0013206 | A1 * | 1/2013 | Guha et al. | 702/3 |

OTHER PUBLICATIONS

C. Jablonowski, 'Adaptive Frids for Weather and Climate Models', Jun. 3, 2011, University of Michigan, Ann Arbor, USA.*
C. Jablonowski, 'Adaptive Frids for Weather and Climate Model', Jun. 3, 2011, University of Michigan, Ann Arbor, USA.*
Manoop Talasila, Mobile Crowd Sensing, Jun. 2011.*
ACLU, Cell Phone Location Tracking Request Response, Sep. 2011.*
H. Huang et al,, "Geoinformation Computing Platforms", "Advanced GeoInformation Science", Jan. 1, 2010, Publisher: CRC Press.

(Continued)

*Primary Examiner* — Michael Nghiem
*Assistant Examiner* — Peter Ngo
(74) *Attorney, Agent, or Firm* — Law Office of Charles W. Peterson, Jr.; Louis J. Percello, Esq.

(57) ABSTRACT

A populace centric weather forecast system, method of forecasting weather and a computer program product therefor. A forecasting computer applies a grid to a forecast area and provides a weather forecast for each grid cell. Area activity data sources indicate human activity in the forecast area. A dynamic selection module iteratively identifies grid cells for refinement in response to the weather forecast and to indicated/expected human activity. The dynamic selection module provides the forecasting computer with a refined grid for each identified grid cell in each iteration. The forecasting computer provides a refined weather forecast in each iteration.

26 Claims, 3 Drawing Sheets

(56) References Cited

OTHER PUBLICATIONS

C. Jablonowski, "Adaptive Mesh Refinement (AMR) for Weather and Climate Models", Jun. 3, 2011, Publisher: http://www-personal.umich.edu/~cjablono/amr.html.

C. Jablonowski, et al., "Adaptive Grids for Weather and Climate Models", "ECMWF Seminar Proceedings on Recent Developments in Numerical", Sep. 6, 2004, Publisher: ECMWF.

M. Parashar et al., "On Partitioning Dynamic Adaptive Grid Hierarchies", "ICSS", Jan. 2, 1996, pp. 604-613, Publisher: Proceedings of the 29th Annual Hawaii International Conference on System Sciences.

M. Parashar et al., "An Infrastructure for Parallel Adaptive Mesh-Refinement Techniques", Apr. 1, 1995, Publisher: University of Texas at Austin.

B. Plale et al., "CASA and LEAD: Adaptive Cyberinfrastructure for Real-Time Multiscale Weather Forecasting", "IEEE Computer Magazine,", Nov. 1, 2006, Publisher: IEEE.

S. Sinha et al., "Adaptive Runtime Partitioning of AMR Applications on Heterogeneous Clusters," Proceedings of the 3rd IEEE International Conference on Cluster Computing, Oct. 8, 2001.

Constantinescu et al., "Modeling Atmospheric Chemistry and Transport with Dynamic Adaptive Resolution," Computational Geosciences, May 3, 2007.

\* cited by examiner

SYSTEM, METHOD AND PROGRAM PRODUCT FOR PROVIDING POPULACE CENTRIC WEATHER FORECASTS

BACKGROUND OF THE INVENTION

Field of the Invention

The present invention is related to providing weather forecasts on wide geographic areas, and more particularly, to tailoring weather forecasts to critical needs of the populace in a wide geographic area.

Background Description

Weather forecasts are based on weather data collected from sensors that are located over a large geographic area or even worldwide. In forecasting the weather for a wide geographic area, the area typically is divided into smaller more manageable units by a superimposing a grid over the area. Then, the relationship of the weather data among the several units or grid locations is described in several algebraic equations, e.g., using a Finite Element Model (FEM) for the gridded area. Frequently, the FEM requires a considerable, even excessive, amount of data processing resources.

Moreover, the higher the grid resolution, the larger the number of units, the more complex the FEM equations and, correspondingly, the more data processing resources consumed in generating weather forecasts. The data processing demands may be such that, it may be infeasible to provide real time or even timely forecasts for all grid locations. This is especially troublesome when, as is commonly the case, forecast results are subject to tight delivery deadlines. What is commonly known as adaptive mesh refinement (AMR) is a type of dynamic mesh refinement that has been used to selectively provide real time forecasts.

Adaptive mesh refinement begins with a low resolution grid for an area. The weather map contains coarse-grained cells to provide rough initial forecasts. Where more detailed forecasts are necessary for certain cells, provided there is sufficient data and time available, those cells are further refined. Typically, refinement is based on quality and quantity of sensors in the area, i.e., focus is on areas with more and better sensors. B. Plale et al., "CASA and LEAD: Adaptive Cyberinfrastructure for Real-Time Multiscale Weather Forecasting," *IEEE Computer Magazine*, 2006, provides an example of sensor based refinement. Unfortunately, weather for an area is an open, unstable and dynamic system and any selected grid may cause have a divergent result. With each divergent result, the grid must be redesigned.

However, there is no guarantee that the redesigned grid will converge on a solution. When redesigning the grid in sensor based refinement does arrive at a solution though, that resulting grid still focuses on weather based the sensors, i.e. sensor quality and quantity. Thus, the final grid still may not conform to where actual interest may lie, e.g., vacation areas in or out of season. The Olympics, for example, are frequently located in somewhat remote areas, such as Lake Placid, N.Y. in 1932 and 1980. In state of the art approaches the refinement criteria could either miss important areas or include unimportant areas that could be skipped entirely. Thus, sensor based refinement still may fail to arrive at an acceptable forecast when, for example, the weather could impact people's lives. So, sensor based refinement frequently requires additional work, e.g., additional solutions. Occasionally, coarse-grained cells were re-included in the forecast to cover those otherwise omitted areas, but without any real improvement over the initial forecast for those areas.

Thus, there is a need for efficiently providing weather forecasts for large areas with a dynamic and unevenly distributed population; and, more particularly for efficiently and quickly arriving at accurate weather forecasts for large populated and unpopulated areas that are directed to areas where weather may have the most impact on the population.

SUMMARY OF THE INVENTION

A feature of the invention is populace centered weather forecasts;

Another feature of the invention is populace driven grid refinement for weather forecasts;

Yet another feature of the invention is providing weather forecasts tailored to the needs of a mobile or fluid population in a large area that has locally populated and unpopulated areas.

The present invention relates to a populace centric weather forecast system, method of forecasting weather and a computer program product therefor. A forecasting computer applies a grid to a forecast area and provides a weather forecast for each grid cell. Area activity data sources indicate human activity in the forecast area. A dynamic selection module iteratively identifies grid cells for refinement in response to the weather forecast and to indicated/expected human activity. The dynamic selection module provides the forecasting computer with a refined grid for each identified grid cell in each iteration. The forecasting computer provides a refined weather forecast in each iteration.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
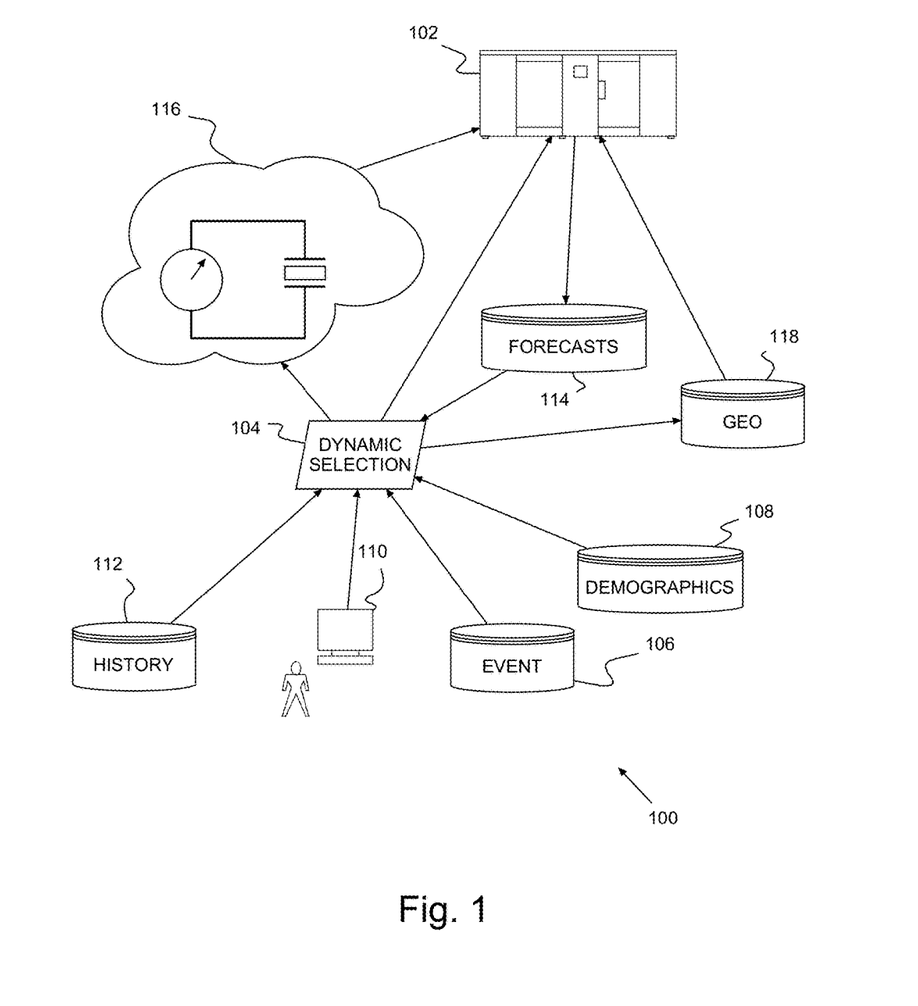
FIG. 1 shows an example of a populace centric weather forecasting system according to a preferred embodiment of the present invention.

Turning now to the drawings and more particularly, FIG. 1 shows an example of a populace centric weather forecasting system 100 according to a preferred embodiment of the present invention. In particular, a preferred system 100 performs cell by cell mesh refinement based on the potential impact on the cell population, i.e., the human, social and cultural impacts associated with each refined cell. The forecast is based not just the permanent population, but transient population passing through or scheduled to be in the cell. Instead of refining the grid based on the quantity and quality of sensors in a particular cell, a preferred system 100 selects cells based on the potential impact that the weather can have on people in the geographical area within the selected cells during the period being forecast.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The preferred system 100 includes one or more forecasting computers 102, one in this example, iteratively providing weather forecasts based on a refined grid provided by a dynamic selection module 104. The dynamic selection module 104 generates the refined grid from collected event data 106, demographic data 108, real-time incident 110 and historical incident data 112, forecast data 114 including real-time sensor data 116, and geographical data from a Geodatabase 118.

The preferred dynamic selection module 104 uses the available data to selectively refine the current grid based on the potential impact of the weather forecasts 114 to the local populace. The preferred dynamic selection module 104 passes each refined grid to the forecasting computer 102, which revises the forecast for the area in the refined grid based on meteorological data 114, real-time sensor data 116, and data from a Geodatabase 118. As the refined forecast area diminishes with each iteration, the data considered in each iteration also diminishes to rapidly converge on a populace centric forecast for the entire forecast area, a forecast tailored to the needs and concerns of the local populace.

Event data 106 includes real-time data from community and social events and scheduled and projected future events. Examples of such events include sporting events such as games and races, concerts, shows, parties, and corteges such as funeral processions. Demographic data 108 includes population density information about specific global areas covered by the forecast system 102. Real-time incident 110 and historical incidents data 112 include data on events such as traffic jams, floods, mudslides, hurricanes, accidents and other incidents reported by agencies and citizens to control centers. Forecast data 114 includes current and previous forecasts provided by forecast system 102. The real-time sensor data 116 includes weather sensor information, such as rain, snow and sleet cloud data taken, for example, from weather satellites, rain gauges, weather sensors, weather radar and any other suitable weather collecting sensors. The Geodatabase 118 holds high, mid and low resolution maps of the terrain related to the areas covered by the forecast system 102. Each of the historic/scheduled data collections 106, 108, 112, 118 may be maintained current, for example, by subscription to a Really Simple Syndication (RSS) event distribution service. Alternately, the computer storing the particular data collection 106, 108, 112, 118 may periodically update stored data.

In each iteration, the dynamic selection module 104 examines the forecast each cell, marking those cells as complete where cell weather and demographic conditions do not warrant further consideration. The marked areas are removed from further consideration and only the remaining cell areas are considered in providing a more comprehensive forecast. For each of those remaining cells, the dynamic selection module 104 generates a tighter grid and passes the new grid to the forecast computer 102.

Essentially, this winnowing begins with identifying cells with good weather, balmy or storm free, posing no risk regardless of area population. The dynamic selection module 104 marks those cells complete.

Then, the dynamic selection module 104 identifies any cells with little or no population and none expected during the forecast period. Identifying cells with little or no population may include checking normally uninhabited areas for transients, e.g., active cellular telephones in or moving through the area. If there are no static demographic concentrations (cities, towns, villages, neighborhoods, etc.) or transients in a cell, the dynamic selection module 104 checks for scheduled activity (social, community or human events) that will draw transients during the forecast period. So, the dynamic selection module 104 also determines from the event data 106, if the cell has any events scheduled for the forecast period. The dynamic selection module 104 marks as complete any cells that have sparse or no population (static or transient); or with population, but that are identified as free from real-time incidents 110 occurring (e.g., in progress) during the forecast period or that are historically free from of weather induced incidents 112.

The dynamic selection module 104 eliminates the corresponding marked areas from further refinement to shrink the forecast area for subsequent iterations. Each remaining cell encloses an area with conditions that prevent marking it complete, and the dynamic selection module 104 generates a tighter grid for that area. The forecast computer 102 uses the tighter grid with a higher resolution map for each such area to refine the forecast for those cells.

It should be noted that event data 106, demographic data 108, historical incident data 112, forecast data 114, and Geodatabase 118 may be separately collected and maintained in individual computers or PCs or in a single computer or server, e.g., a forecasting computer 102. Also, any one or more of the data sources 106, 108, 110, 112, 114, 116, 118 may be contained in a single storage on a single computer or distributed in multiple such storage locations on separate individual computers, e.g., in what is known as the cloud. Further, real time incident 110 and sensor data 116 may be stored as historic data, e.g., 112, as it is provided directly to the forecast computer 102 and Dynamic Selector or dynamic selection module 104. Similarly, the Dynamic Selector 104 may be provided by the forecast computer 102 or separately provided.

Figure 2:
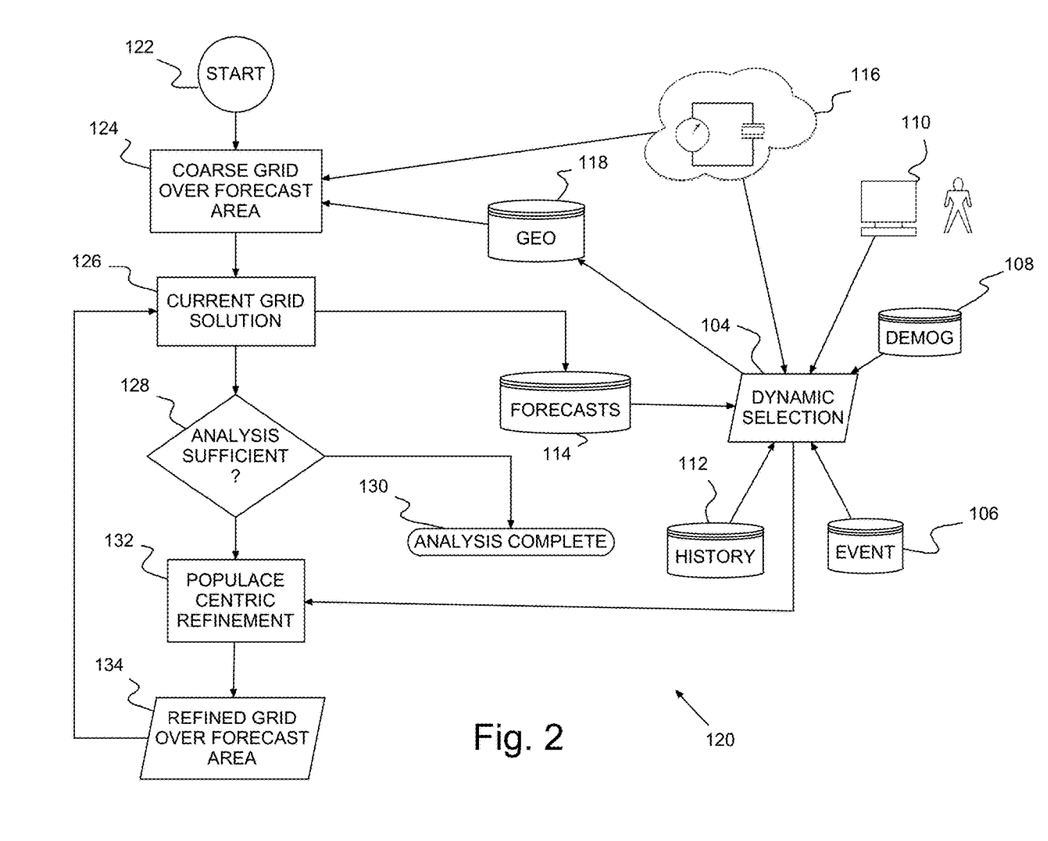
FIG. 2 shows an example of dynamically refining weather forecasts according to an embodiment of the present invention.

FIG. 2 shows a more detailed example of dynamically refining weather forecasts 120 according to a preferred embodiment of the present invention, e.g., using the system 100 of FIG. 1, with like features labeled identically. After initially defining a large forecast area 122, the forecast system 102 superimposes 124 a coarse grid over on the forecast area 122. The forecast system 122 makes a quick forecast 114 of the weather for each cell area of the coarse grid. Once the dynamic selection module 104 has marked every cell complete, the quick forecast 114 is sufficient 128, and analysis is complete 130.

If, however, the quick forecast 114 is insufficient 128, the dynamic selection module 104 provides 132 the forecast system 102 with a refined grid for selected cells, i.e., for locally better forecast resolution. The forecast system 102 superimposes 134 a corresponding refined grid on the selected, remaining cells and makes 126 a refined forecast 114 for each of those cells. Again, the dynamic selection module 104 checks each cell of the refined gridded areas, marking those complete where demographics and weather allow. If the dynamic selection module 104 marks all refined cells complete, the forecast 114 is sufficient 128 for all the refined cells, analysis is complete 130. Otherwise, the forecast system 102 continues using increasingly refined granularity 132 from the dynamic selection module 104 for increasingly smaller areas to arrive 130, iteratively, at an acceptable 128 forecast 114.

So, for a given wide area 122, e.g., a continent or a country, an initial N by M coarse grid is selected, either manually arbitrarily selecting values for N and M or by default. The values of N and M are unimportant, other than to provide a starting point for the first iteration. Typically, however, N and M are selected such that the cells are square and the product (N×M) is at least equal to the number of forecasting computers 102. Preferably, N and M are selected or set initially, such that at that coarse resolution, the system 100 quickly delivers 126 a forecast 114 that lacks very rich details.

The forecast system 102 provides the first, quick forecast 114 using the N by M coarse grid superimposed on mid or low resolution map(s), e.g., an area map at the lowest available resolution from geodatabase 118, in combination with the meteorological sensor data 116. Preferably, the forecast system 102 forecasts 126 cell weather using a numerical model solver, e.g., a model based on computer fluid dynamics. The Weather Research and Forecasting (WRF) model is an example of forecasting weather based on computer fluid dynamics. See, e.g., IBM's Deep Thunder www.research.ibm.com/weather/DT.html for one such WRF model.

Then, the forecast system 102 passes the initial forecast 114 to the dynamic selection module 104. The dynamic selection module 104 marks complete unpopulated and uneventful coarse cells, and coarse cells with favorable or mild weather, and the coarse-resolution analysis is sufficient 128 for areas in the marked cell(s). The remaining, unmarked coarse cells have conditions during the forecast period that require further analysis, e.g., rainstorms or hurricanes, or other events, scheduled or otherwise. For example, some unmarked cells may have a history of fires during drought or landslides during rain. In any iteration, when all of the cells are marked as complete 128, additional action is unnecessary; and, the dynamic selection module 104 notifies the forecast system 102 that the forecast is complete 130.

Alternately, the dynamic selection module 104 may use event data 106, demographic data 108 and real-time incidents 110 to weight variables in deciding about whether additional refinement of any cell is needed or not. The decision may be automatic, e.g., if the weighted response exceeds a threshold, or manual in response to input from a human.

Until all cells are marked complete 130, however, some cells remain that enclose, e.g., inclement weather in heavily populated areas, or in uninhabited or sparsely populated venues for scheduled events or with a history of problems. The dynamic selection module 104 selects an I by K grid, where I and K also are arbitrarily selected, for a higher resolution forecast for the remaining areas.

The dynamic selection module 104 passes the higher resolution grid 132 to the forecast system 102, which begins the next iteration 126. In this and each subsequent iteration, the forecast system 102 applies the refined grid to higher resolution local maps from geodatabase 118 for those previously unmarked cells. Then, the forecast system 102 generates a forecast 114 for each refined grid cell based on available information in event data 106, demographic data 108, real-time incident 110 and historical incident data 112, forecast data 114 and real-time meteorological sensor data 116. Preferably, the forecast system 102 uses a numerical model solver on the sensor data 116 to provide 126 a refined forecast 114 for each cell in the newly gridded areas.

With each new refined forecast 114, the dynamic selection module 104 further reduces the area being considered by marking complete any refined cells with no predicted activity. If there are unmarked cells after marking, those cells are further refined 132 in the next iteration using the next highest map resolution. Refining the grid and forecasting 114 continues until the dynamic selection module 104 finds an unchanged, identified final resolution or until the forecast is provided for the highest resolution map for an unmarked area and no further refinement is available. At that point the cell is marked complete 128. After all of the cells are marked complete 128, additional action is unnecessary and the forecast is complete 130.

Figure 3:
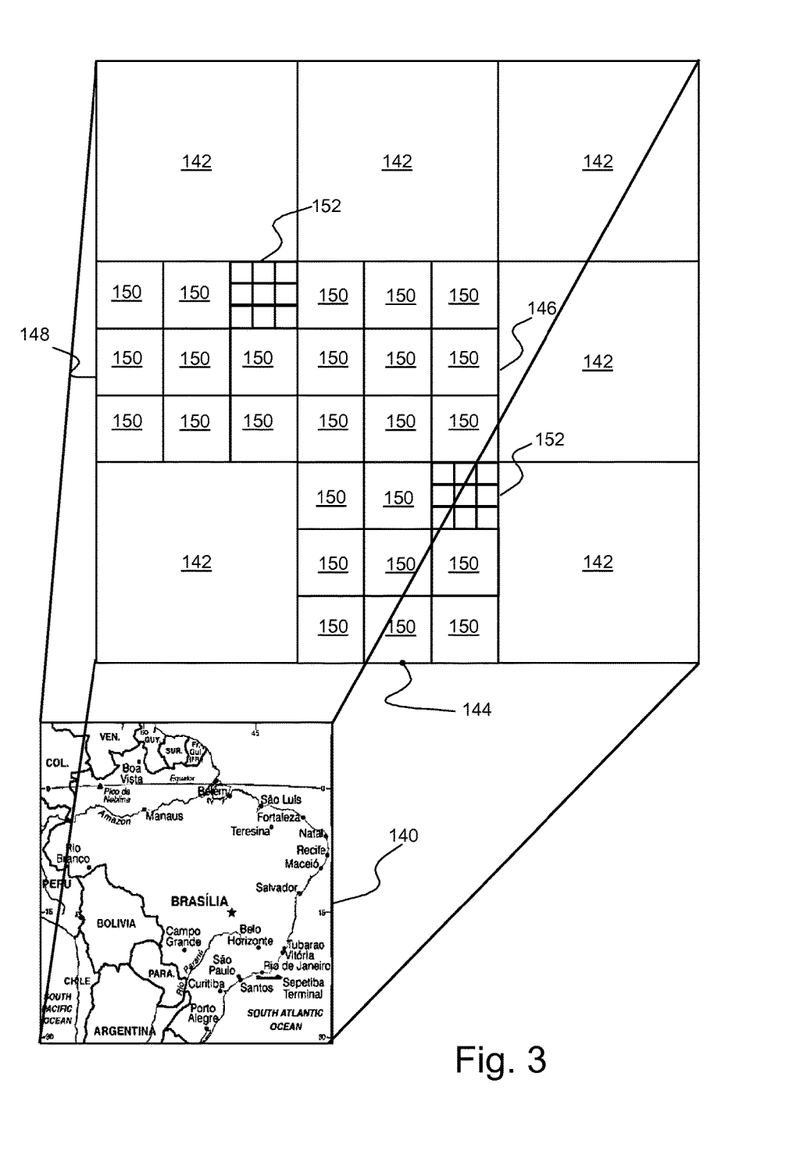
FIG. 3 shows a simple example of refining a forecast for a wide area, wherein grid refinement is populace centric for local analysis and forecasting according to a preferred embodiment of the present invention.

FIG. 3 shows a simple example of refining a forecast for a wide area 140, wherein for local analysis and forecasting, grid refinement is populace centric according to a preferred embodiment of the present invention; and with further reference to the system 100 of FIG. 1 and method 120 of FIG. 2. In the initial iteration a three by three (3×3) square cell grid is overlaid on wide area 140. After the initial forecast 114, subsequent iterations are populace centric.

In this example, the dynamic selection module 104 begins by selecting one cell and gathers demographic data 108 about the inhabitants and transient population in the area contained in the selected cell. If the demographic analysis indicates has clear or otherwise stable weather during the forecast or that the selected cell is deserted and has no scheduled events, for example, that cell 142 is marked complete. Otherwise, for example, unmarked cells may contain cities, villages or some other human activity, static or transient. The dynamic selection module 104 determines that these areas need further examination and refines the grid for those areas in a population centric refinement.

So after the coarse forecast in this example, six (6) cells 142 are marked complete, e.g., uninhabited areas that may even be experiencing heavy rain or densely populated areas with clear, balmy weather. The remaining three (3) cells 144, 146, 148 contain inclement weather and significant population or have scheduled or unscheduled events, e.g., a history of weather related events. The dynamic selection module 104 marks all but those 3 cells 144, 146, 148, which remain unmarked for a more comprehensive forecast.

With each iteration, the dynamic selection module 104 can prioritize unmarked areas by weighting information from static data (e.g., fixed population and scheduled events) and dynamic data (e.g., transient population and events that have a history of occurring during inclement weather) to grid the areas and forecast weather for increasingly smaller geographic regions. For example, the dynamic selection module 104 can identify and give higher priority to coarse cells with storm activity in populated areas, i.e., weather that may threaten demographically dense regions located in those coarse cells. With each iteration the forecast 114 is complete for more area, as areas where the weather is likely to have little impact or, where a higher resolution forecast is unavailable, are marked complete. Some marked unpopulated areas may even have significant weather, for example, storms that are in areas where people are likely to be unaffected.

After the first iteration the dynamic selection module 104 generates a set of sub-regions only for each unmarked cell, i.e., a locally higher resolution grid. So, a smaller 3×3 grid is applied to cells 144, 146, 148. The refined grid is returned to the forecast system 102 for refining 126 the forecast 114 for the area of cells 144, 146, 148 with better confidence. After this second iteration, refined grid cells 150 in cell 146 are marked complete. Thus, cell 146 is also complete because each cell 150 in cell 146 either lacks significant population where weather is inclement or, because the local forecast shows fair weather in cells 150 where people reside.

Only 2 of the refined grid cells 152 remain unmarked after the refined forecast 114 of the second iteration. These remaining cells 152, most likely, have densely populated locations with heavy weather or have moderately populated locations with scheduled events or a history of weather events even in moderate weather (e.g., frequent mud slides). Alternately, the dynamic selection module 104 may simultaneously locate heavily populated locations in all unmarked cells and grid those cells first in a refinement 132. In the next and final iteration of this example, the dynamic selection module 104 applies a still smaller 3×3 grid to cells 152. Then, the forecast system 102 retrieves the next highest resolution map from geodatabase 118 and applies the refined grid 134 to the higher resolution map. The forecast system 102 uses this highest resolution grid and map to refine the forecast 114 for those cells 152 to complete the population centric forecast.

A preferred system 100 can use all those information for various local areas to trigger a nested and fine grain resolution Weather Forecast for that/those areas. Unlike prior methods that rely solely on static information or on where cloud formation locations, the preferred populace centric forecast system 100 provides weather forecasts, tailored to the dynamic nature of the local populace. These populace centric forecasts efficiently leverage system facilities, selectively providing high resolution results only as and where necessary; while otherwise minimizing resources used in providing forecasts to areas determined to be less critical or less important. Thus, a preferred system 100 optimizes computing resource usage leading to a greener data center and insuring considering the dynamic characteristics of local people and cities in complete region forecasts.

For 2 separate occasions of inclement weather, for example, an amphitheater, may be gridded initially in the same coarse cell. A concert is scheduled in the amphitheater during the first forecast period and the amphitheater is empty during the second. Thus, the coarse cell from the first pass or iteration is refined for at least one subsequent iteration to provide a forecast for concertgoers. In the second forecast iteration, however, because people are elsewhere, weather is unimportant for the amphitheater. The initial coarse cell forecast is sufficient. Thus, a preferred system 100 dedicates system resources to providing the detailed forecast for the concert; and, frees much of those resources for use elsewhere when a detailed forecast is unnecessary.

Thus advantageously, the preferred system 100 can provide a very localized and targeted, but robust forecast by considering all available information. The preferred system 100 uses both dynamic information, e.g., event venue (concerts, parties, races, tournaments) schedules, area wide traffic patterns and population fluidity, and historically hazardous (landslides and floods) areas; and static information, e.g., high demographic concentrations. Moreover, from this information, the preferred system 100 verifies which places are scheduled to host, or are currently hosting, special events; assesses which local areas are historically considered dangerous or susceptible to natural disasters; and identifies densest locations in the forecast area.

These different types of information may be used to eliminate coarser cells where weather is less or less likely to impact the local populace from an increasingly local area; and focus with increasing granularity through more and more refined, higher resolution cells where more detailed, and more comprehensive forecasts are desired. Further, dynamic information may be collected on transient population, for example, from cell phone providers detecting geolocation of anonymous people in remote locations, from traffic sensors detecting traffic jams or intense traffic of vehicles and people, and from currently scheduled incidents taking place in specific regions.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A populace centric weather forecast system comprising:
    a forecasting computer applying a dynamic grid to a forecast area and providing a weather forecast for each grid cell;
    one or more area activity data sources indicating human presence in said forecast area;
    one or more area activity sensors collecting signals of real time activity in said area, said one or more area activity sensors including user locations collected from at least one cell phone provider anonymously detecting user geolocations in remote locations in said forecast area, human activity in a grid cell including human presence and real time activity; and
    a dynamic selection module selectively marking cells in said dynamic grid complete and iteratively identifying unmarked grid cells in each iteration for further refinement responsive to said weather forecast and indicated said human activity, in each iteration
        said dynamic selection module identifies only grid cells with both weather and human activity for further refinement and marks complete all grid cells not identified for further refinement, all grid cells marked complete being omitted from refinement in subsequent iterations,
        said dynamic selection module provides said forecasting computer with a current grid omitting complete cells for further weather forecasting and including a refined grid for each identified said grid cell in said each iteration, wherein omitting cells reduces the weather forecast area and reducing the weather forecast area reduces the data considered for forecasting weather to only the refined gridded area, and
        said forecasting computer provides a more comprehensive weather forecast for the reduced weather forecast area from said current grid in said each iteration,
    wherein each final dynamic grid causes the resulting final weather map for the entire said forecast area to have a finer resolution weather forecast displayed in inclement weather affected areas with humans present than in areas unaffected by weather or free of human activity, whereby final weather maps for forecasts of said forecast area with different human activity in one or more locations in said forecast area have different resolutions in said one or more locations and said forecasting computer arrives at said each final weather map without post solution activity.

2. A populace centric weather forecast system as in claim 1, wherein said one or more area activity data sources include historical data and projected data, said real time activity includes transient activity indicated from said one or more area activity sensors, and said one or more area activity sensors further including traffic sensors detecting traffic jams or intense traffic.

3. A populace centric weather forecast system as in claim 2, wherein said one or more area activity data sources include event data, demographic data, historical incident data, weather sensor data and geodata, and said projected data including population scheduled to be in a cell.

4. A populace centric weather forecast system as in claim 3, wherein said weather sensor data includes real time sensor data, and said real time activity includes transient activity for population passing through a cell.

5. A populace centric weather forecast system as in claim 1, wherein in each said iteration said forecasting computer overlays said current grid on an area map from a geodatabase and forecasts weather for each grid cell responsive to real time weather sensor data, and wherein whenever event data indicates an event is scheduled for a locale in said inclement weather affected areas, the forecast resolution for the event locale is at the highest resolution.

6. A populace centric weather forecast system as in claim 1, wherein said one or more area activity data sources comprise dynamic information sources and static information sources, dynamic information including event venue schedules, area wide traffic patterns and population fluidity, and historically hazardous area identification, and static information includes, identified high demographic concentration areas.

7. A populace centric weather forecast system as in claim 6, wherein said forecast area includes at least one event venue located in an otherwise unpopulated locale, such that whenever said event venue schedule indicates that during the forecast period no events are scheduled at the event locale, the current grid cell enclosing said event locale is not identified for refinement because of the event venue, and when said event data indicates an event is scheduled, in each iteration the current grid cell enclosing said event locale is identified for refinement with inclement weather.

8. A method of forecasting weather, said method comprising:
   overlaying an initial grid on a forecast area, a forecasting computer overlaying said initial grid, said initial grid being a first iteration of a dynamic grid at a first resolution grid cell, said dynamic grid segmenting said forecast area into cells; and iteratively
   forecasting the weather during a forecast period for the area enclosed in each cell;
   collecting static population information for said forecast area;
   collecting dynamic population sensor signals indicating local human activity throughout said forecast area, said dynamic population sensor signals including presence indication signals from at least one cell phone provider anonymously detecting user geolocations in remote locations in said forecast area, any cell enclosing static or transient population being considered as containing human activity;
   marking complete each cell with either weather or human inactivity, such that only grid cells with both weather and human activity are not marked complete;
   determining if all cells are marked complete; and until all cells are marked complete
      refining every cell not marked complete with a refined grid, the current grid omitting all cells marked complete for further weather forecasting and including the refined grid cells, wherein omitting cells for further weather forecasting reduces the weather forecast area and reducing said weather forecast area reduces the data considered,
      overlaying said current grid with said refined grid on a respective forecast area not marked complete, and
      returning to forecasting the weather in said weather forecast area for the next iteration, wherein in said next iteration the weather is forecast only for each area enclosed in each refined grid cell; and when all cells are marked complete
   providing a final weather map for said forecast area, the final dynamic grid causing finer resolution weather displayed in inclement weather areas with human activity than in areas unaffected by weather or free of human activity, whereby the final dynamic grids cause respective final weather maps for forecasts of said forecast area with different human activity in one or more locations in said forecast area to have different resolutions in said one or more locations and iteratively forecasting converges on said final weather map without post solution activity.

9. A method of forecasting weather as in claim 8, wherein said dynamic population sensor signals further include traffic sensors detecting traffic jams or intense traffic, and when all cells are marked complete, the weather forecast for said forecast area is complete.

10. A method of forecasting weather as in claim 8, wherein said population information includes historical data and projected data.

11. A method of forecasting weather as in claim 8, wherein
   said human activity includes event data, demographic data, historical incident data, weather sensor data and geodata, and
   said forecast area includes at least one event venue located in an otherwise unpopulated locale, such that whenever said event data indicates that during the forecast period no event is scheduled at the event locale a grid cell enclosing said event locale is not identified for refinement because of the event venue, and when said event data indicates an event is scheduled, in each iteration the grid cell enclosing said event locale is identified for refinement with inclement weather.

12. A method of forecasting weather as in claim 8, wherein cells marked complete include uninhabited cells with inclement weather forecast and heavily populated cells with clear weather forecast, uninhabited cells including cells with no current or projected transient activity.

13. A method of forecasting weather as in claim 8, wherein overlaying said initial grid on said forecast area comprises overlaying said initial grid on a map of said forecast area having a first resolution, said refined grid being overlaid on a higher resolution map of said respective cell area.

14. A method of forecasting weather as in claim 13, wherein cells are further marked complete whenever a forecast has been provided for said respective forecast area with said refined grid overlaid on the highest resolution map, such that said final weather map has finer resolution both for displayed weather and geography in inclement weather areas with human activity than in areas unaffected by weather or free of human activity.

15. A computer program product for forecasting weather, said computer program product comprising a non-transitory computer usable medium having computer readable program code stored thereon, said computer readable program code causing a computer executing said code to:
   overlay an initial grid on a forecast area, said initial grid being a first iteration of a dynamic grid at a first resolution grid cell, said dynamic grid segmenting said forecast area into cells; and iteratively
   forecast the weather for the area enclosed in each cell, said forecast being for a forecast period;
   collect static population information for said forecast area;
   collect dynamic population sensor signals indicating local human activity throughout said forecast area, said dynamic population sensor signals including presence indication signals from at least one cell phone provider anonymously detecting user geolocations in remote locations in said forecast area, any cell enclosing static or transient population being considered as containing human activity;
   mark as complete each cell with either weather inactivity or human inactivity during said forecast period;
   identify any cells not marked complete as unmarked cells, only grid cells with both weather and human activity being not marked complete and further refined; and as long as unmarked cells remain:
  refine the area in every unmarked cell with a refined grid, the current grid omitting all cells marked complete for further weather forecasting and including the refined grid cells, wherein omitting cells for further weather forecasting reduces the weather forecast area and reducing said weather forecast area also reduces the data considered in said next iteration,
  overlay said current grid with said refined grid on a respective unmarked forecast area, and
  return to forecast the weather in said weather forecast area in a next iteration, wherein the weather is forecast only for each area enclosed in each refined grid cell; and when all cells are marked complete
provide a final weather map for said forecast area, the final dynamic grid causing finer resolution weather displayed in inclement weather areas with human activity than in areas unaffected by weather or free of human activity, whereby the final dynamic grids cause respective final weather maps for forecasts of said forecast area with different human activity in one or more locations in said forecast area to have different resolutions in said one or more locations and iteratively forecasting converges on said final weather map without post solution activity.

16. A computer program product for forecasting weather as in claim 15, wherein said dynamic population sensor signals further include traffic sensors detecting traffic jams or intense traffic, and overlaying said initial grid on said forecast area comprises retrieving a map of said forecast area having a first resolution and overlaying said initial grid on said map.

17. A computer program product for forecasting weather as in claim 16, wherein overlaying said refined grid comprises retrieving a higher resolution map of said respective forecast area, said refined grid being overlaid on said higher resolution map, and wherein said cells in said refined grid are further marked complete whenever a forecast has been provided for the highest resolution map for said respective forecast area, such that said final weather map has finer resolution both for displayed weather and geography in inclement weather areas with human activity than in areas unaffected by weather or free of human activity.

18. A computer program product for forecasting weather as in claim 15, wherein conditions in said forecast area are modeled with a fluid dynamics model to forecast the weather and whenever all cells are marked complete, the weather forecast for said forecast area is complete for said forecast period.

19. A computer program product for forecasting weather as in claim 15, wherein marking cells comprises determining whether historical, real time and projected activity indicates weather activity and human activity during said forecast period in said forecast area, said projected activity being projected from event data, demographic data, historical incident data, forecast data, weather sensor data and geodata.

20. A computer program product for forecasting weather as in claim 19, wherein said forecast area includes at least one event venue located in an otherwise unpopulated locale, such that whenever said projected activity projects no activity during the forecast period, the current grid cell enclosing said event locale is not identified for refinement because of the event venue, and when said projected activity projects activity, in each iteration the current grid cell enclosing said event locale is identified for refinement with inclement weather.

21. A computer program product for forecasting weather in a populace centric weather forecast, said computer program product comprising a non-transitory computer usable medium having computer readable program code stored thereon, said computer readable program code comprising:
  computer readable program code means for applying a dynamic grid to a forecast area;
  computer readable program code means for providing a weather forecast for each dynamic grid cell in said forecast area;
  computer readable program code means for collecting static population information for said forecast area;
  computer readable program code means for collecting dynamic population sensor signals indicating local human activity throughout said forecast area, said dynamic population sensor signals including presence indication signals from at least one cell phone provider anonymously detecting user geolocations in remote locations in said forecast area, any cell enclosing static or transient population being considered as containing human activity, wherein said human activity includes real time activity;
  computer readable program code means for indicating weather and human activity in said forecast area;
  computer readable program code means for selectively marking cells in said dynamic grid complete and iteratively identifying grid cells in each iteration for further refinement responsive to indicated said weather and human activity in each grid cell, only grid cells with both weather and human activity indicated being identified for further refinement, and for marking complete any grid cell not identified for further refinement; and
  computer readable program code means for providing a current grid omitting all grid cells marked complete for further weather forecasting and including a refined grid for each identified said grid cell, wherein omitting cells for further weather forecasting reduces the weather forecast area and reducing said weather forecast area for further weather forecasting also reduces the data considered in said next iteration, said computer readable program code means for applying said grid applying said current grid to said weather forecast area, a more comprehensive said weather forecast being provided for said weather forecast area in the next iteration, the final dynamic grid causing a populace centric weather forecast such that each final weather map has finer forecast resolution weather displayed in inclement weather areas with humans present or transient than in areas unaffected by weather or free of human activity, whereby the final dynamic grids cause respective final weather maps for forecasts of said forecast area with different human activity in one or more locations in said forecast area to have different resolutions in said one or more locations and iteratively forecasting computer arrives at said each final weather map without post solution activity.

22. A computer program product for forecasting weather in a populace centric weather forecast as in claim 21, wherein said dynamic population sensor signals further include traffic sensors detecting traffic jams or intense traffic, and said computer readable program code means for indicating weather and human activity comprises computer readable program code means for storing event data, demographic data, historical incident data, forecast data and a geodatabase.

23. A computer program product for forecasting weather in a populace centric weather forecast as in claim 22, further comprising computer readable program code means for receiving weather sensor data.

24. A computer program product for forecasting weather in a populace centric weather forecast as in claim 23, wherein said event data includes data on historical events and scheduled events.

25. A computer program product for forecasting weather in a populace centric weather forecast as in claim 24, wherein said forecast area includes at least one event venue located in an otherwise unpopulated locale, such that whenever said event data indicates that during the forecast period no events are scheduled at the event locale, the current grid cell enclosing said event locale is not identified for refinement because of the event venue, and when said event data indicates an event is scheduled, in each iteration the current grid cell enclosing said event locale is identified for refinement with inclement weather.

26. A computer program product for forecasting weather in a populace centric weather forecast as in claim 22, wherein said computer readable program code means for applying said grid overlays said current grid on a higher resolution, such that said final weather map has finer resolution both for displayed weather and geography in inclement weather areas with human activity than in areas unaffected by weather or free of human activity.

* * * * *